United States Patent
Drinic et al.

(10) Patent No.: US 9,399,368 B2
(45) Date of Patent: Jul. 26, 2016

(54) METHOD AND DEVICE FOR EMBOSSING AN UNEVEN SURFACE OF A BODY WITH A TRANSFER LAYER OF A HOT EMBOSSING FILM

(71) Applicant: LEONHARD KURZ Stiftung & Co. KG, Furth (DE)

(72) Inventors: Ljubisa Drinic, Nuremberg (DE); Heribert Riehl, Allersberg (DE)

(73) Assignee: LEONARD KURZ STIFTUNG & CO. KG, Furth (DE)

( * ) Notice: Subject to any disclaimer, the term of this patent is extended or adjusted under 35 U.S.C. 154(b) by 0 days.

(21) Appl. No.: 14/431,503

(22) PCT Filed: Sep. 25, 2013

(86) PCT No.: PCT/EP2013/070021
§ 371 (c)(1),
(2) Date: Mar. 26, 2015

(87) PCT Pub. No.: WO2014/053381
PCT Pub. Date: Apr. 10, 2014

(65) Prior Publication Data
US 2015/0251408 A1  Sep. 10, 2015

(30) Foreign Application Priority Data
Oct. 1, 2012  (DE) .......... 10 2012 109 315

(51) Int. Cl.
| | |
|---|---|
| B44C 1/17 | (2006.01) |
| B65C 9/18 | (2006.01) |
| B29C 63/00 | (2006.01) |
| B41F 19/02 | (2006.01) |
| B29C 51/46 | (2006.01) |
| B29C 51/08 | (2006.01) |
| B29C 51/16 | (2006.01) |
| B29C 51/26 | (2006.01) |
| B29C 51/42 | (2006.01) |

(52) U.S. Cl.
CPC ........... *B44C 1/1729* (2013.01); *B29C 63/0034* (2013.01); *B41F 19/02* (2013.01); *B65C 9/1873* (2013.01); *B29C 51/082* (2013.01); *B29C 51/16* (2013.01); *B29C 51/262* (2013.01); *B29C 51/428* (2013.01); *B29C 51/46* (2013.01); *B29C 63/0073* (2013.01); *B29C 2791/006* (2013.01)

(58) Field of Classification Search
CPC .. B44C 1/1729; B65C 9/1873; B29C 51/165; B41M 3/12
See application file for complete search history.

(56) References Cited

U.S. PATENT DOCUMENTS

| | | | | |
|---|---|---|---|---|
| 4,360,329 A | * | 11/1982 | Hatakeyama | ....... B29C 45/1418 264/132 |
| 4,906,316 A | * | 3/1990 | Seidl | ........................ B41J 2/325 101/93.01 |

(Continued)

FOREIGN PATENT DOCUMENTS

| | | |
|---|---|---|
| CN | 101039793 | 9/2007 |
| CN | 101554933 | 10/2009 |

(Continued)

*Primary Examiner* — Justin Olamit
(74) *Attorney, Agent, or Firm* — Hoffman & Baron, LLP

(57) ABSTRACT

The invention relates to a method for stamping a non-planar surface (14) of a body (1) with a transfer layer of a hot-stamping foil (5), in which a stamping region of the hot-stamping foil (5) is brought into abutment against the surface (14) of the body (1) and a heated stamping die (3) is pressed against the hot-stamping foil (5) and the surface (14) of the body (1) such that, in the stamping region, the transfer layer detaches from a support of the hot-stamping foil (5) and adheres to the surface (14) of the body (1). In the invention, the hot-stamping foil (5) is pre-heated in a region comprising the entire stamping region before the stamping procedure, in particular by a heating apparatus (6) which is insertable and withdrawable into the device.

9 Claims, 16 Drawing Sheets

(56) References Cited

U.S. PATENT DOCUMENTS

| | | | | |
|---|---|---|---|---|
| 5,318,660 | A * | 6/1994 | Olsen | B32B 37/0076 156/231 |
| 6,517,649 | B1 * | 2/2003 | Rugg | B29C 51/46 156/286 |
| 6,524,419 | B1 | 2/2003 | Dabrowski, Jr. et al. | |
| 2006/0231983 | A1 | 10/2006 | Kondo | |
| 2008/0216692 | A1 | 9/2008 | Zaher et al. | |

FOREIGN PATENT DOCUMENTS

| | | |
|---|---|---|
| CN | 101734033 | 6/2010 |
| DE | 3440131 | 5/1986 |
| DE | 4309400 | 9/1993 |
| DE | 4433054 | 2/1996 |
| DE | 102009022542 | 12/2010 |
| EP | 0668030 | 8/1995 |
| EP | 1854616 | 11/2007 |

* cited by examiner

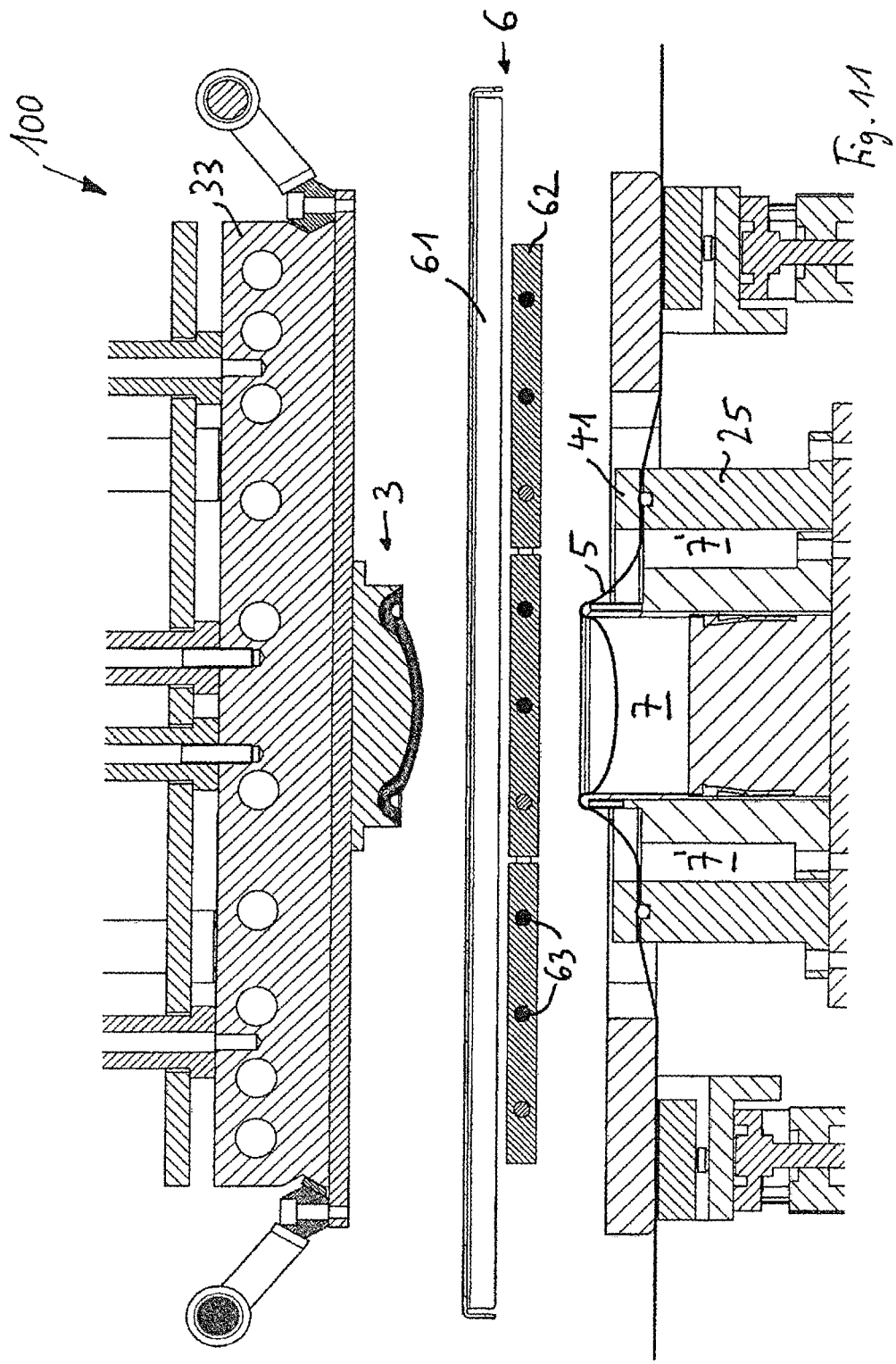

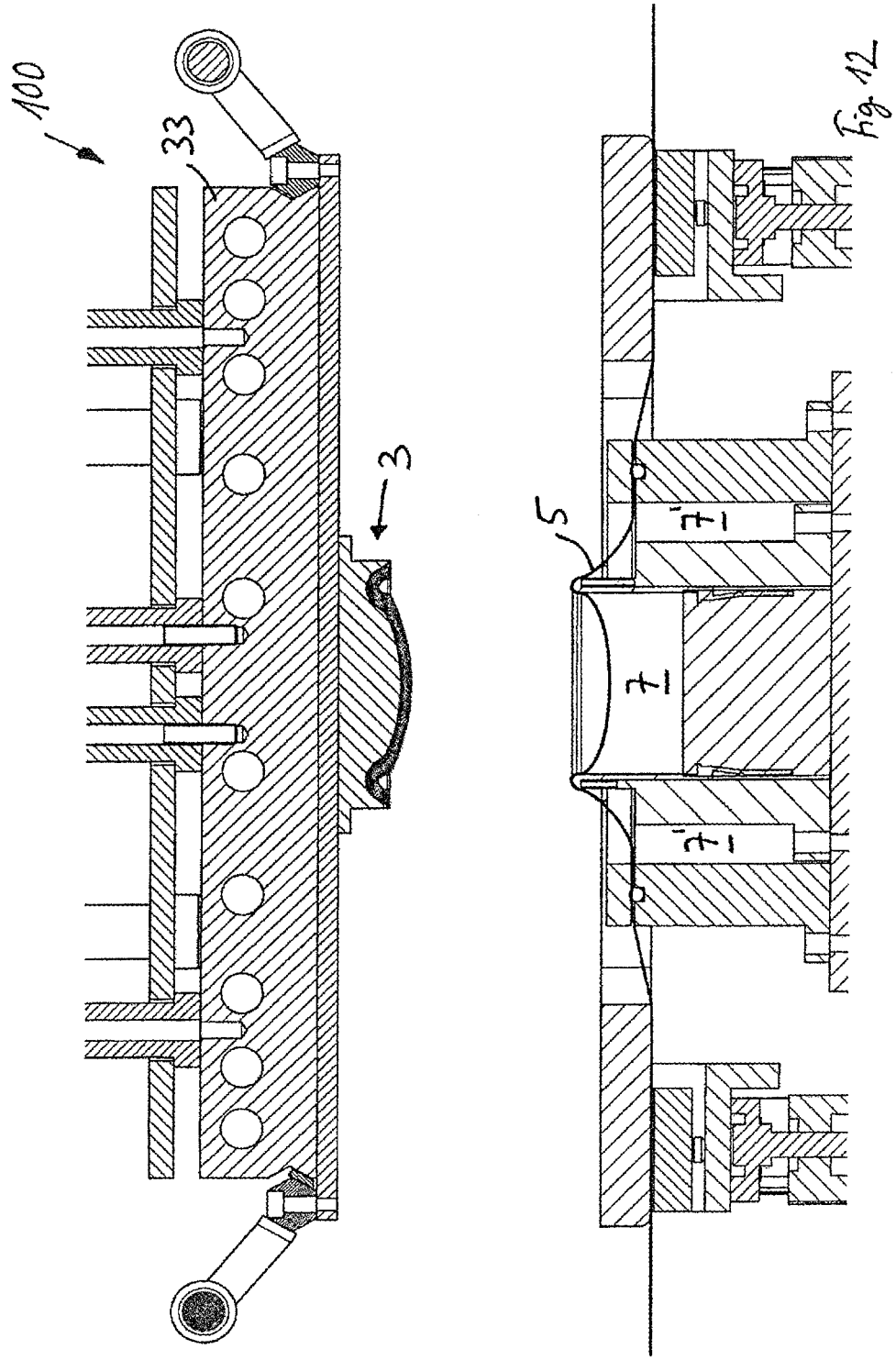

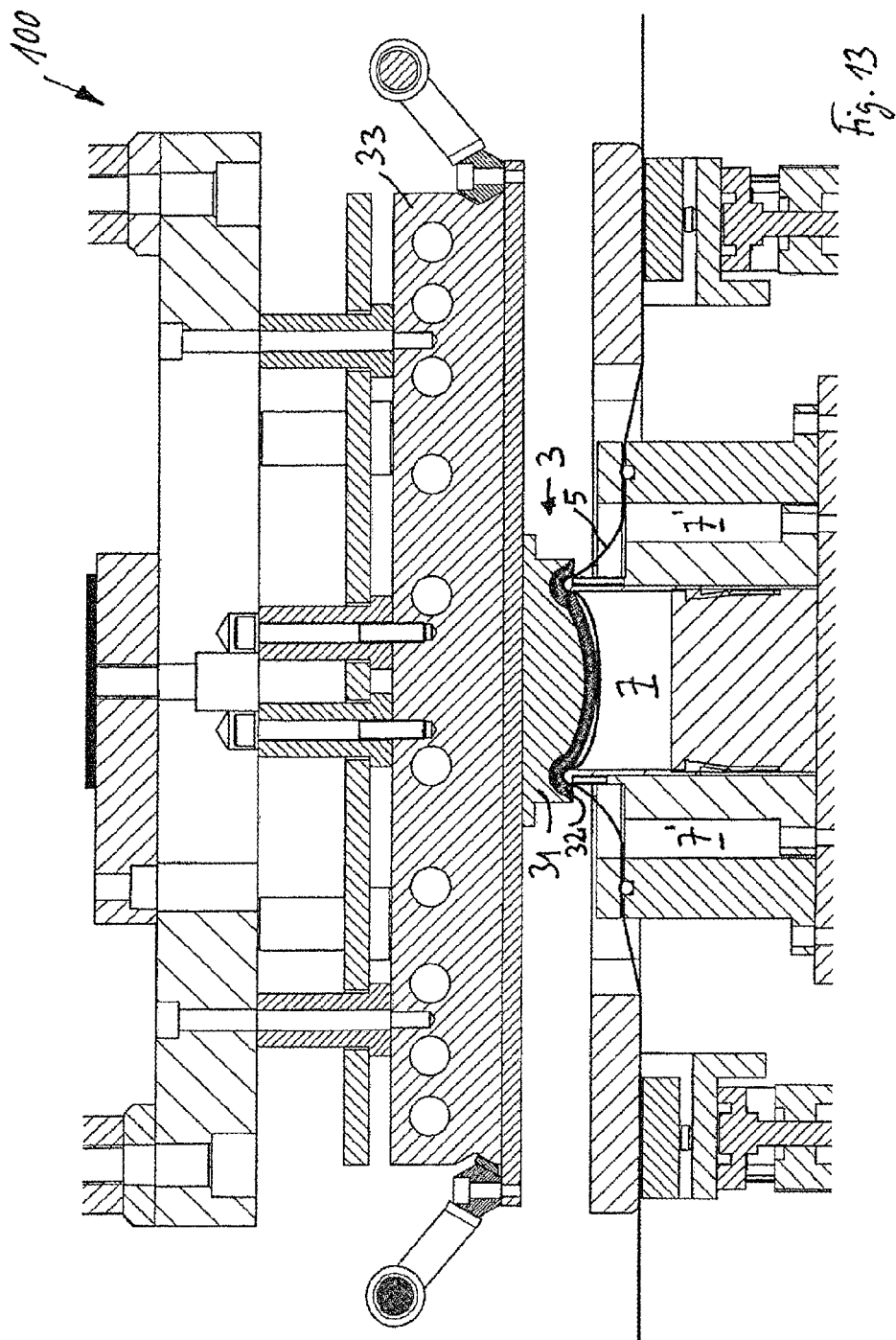

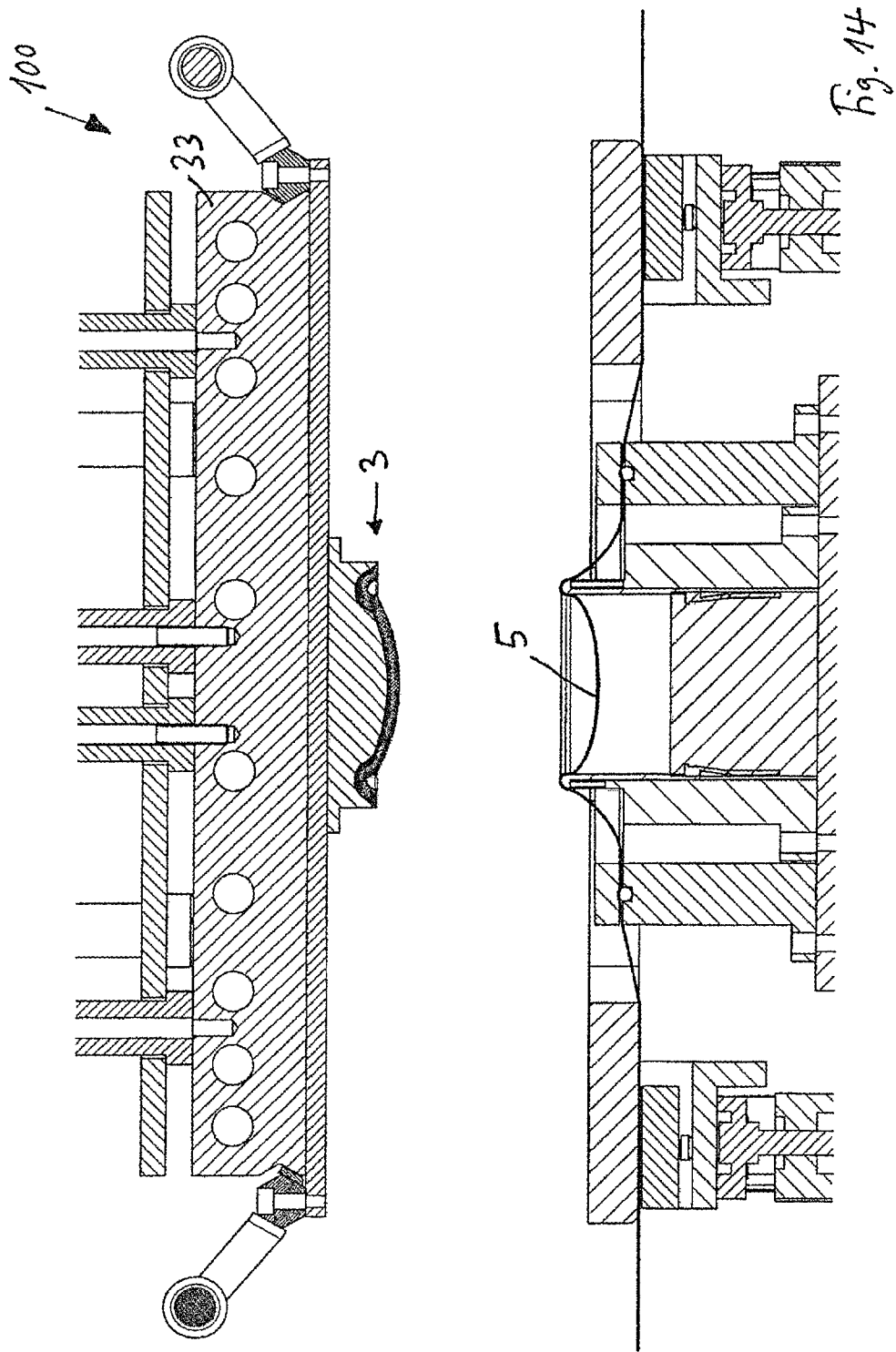

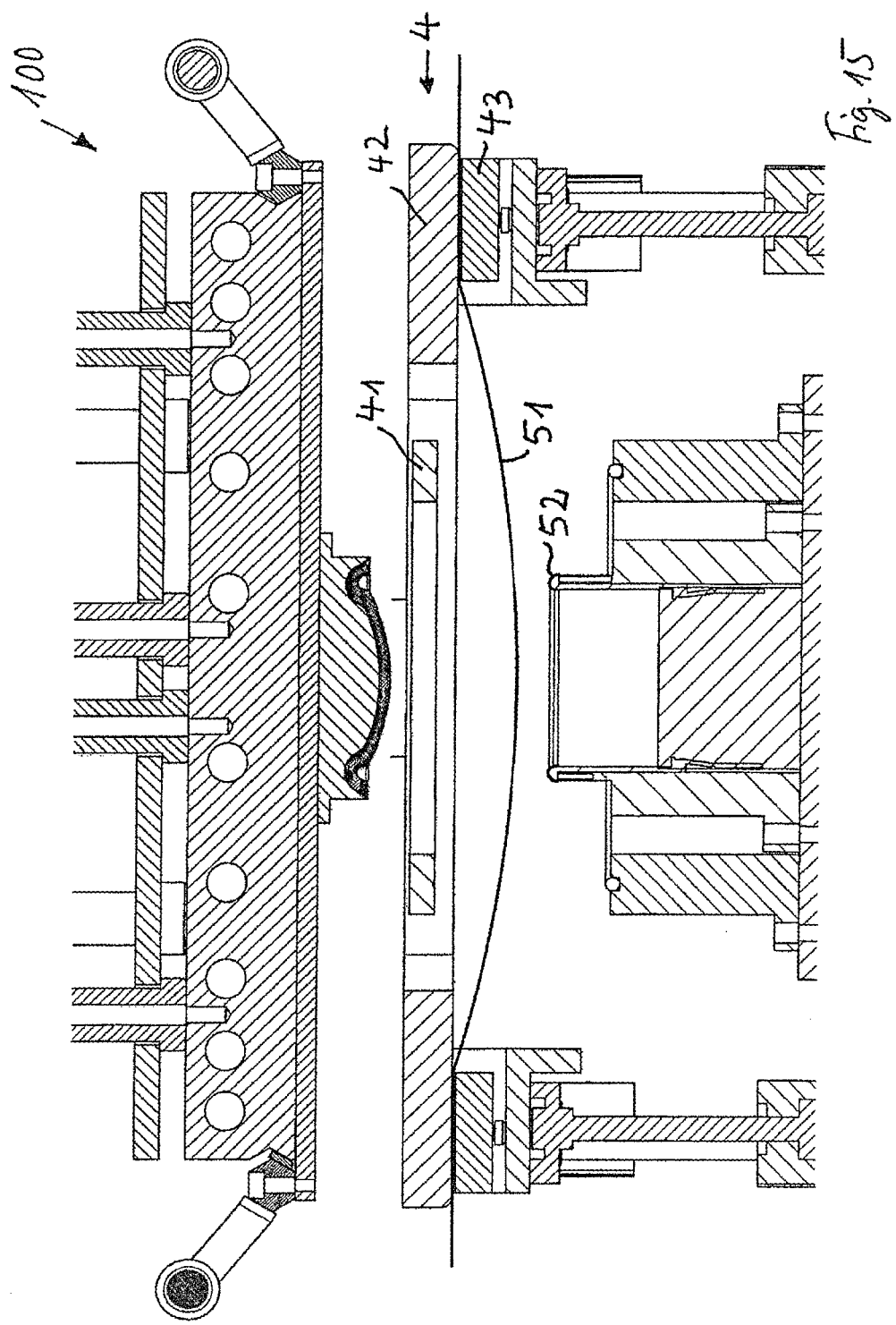

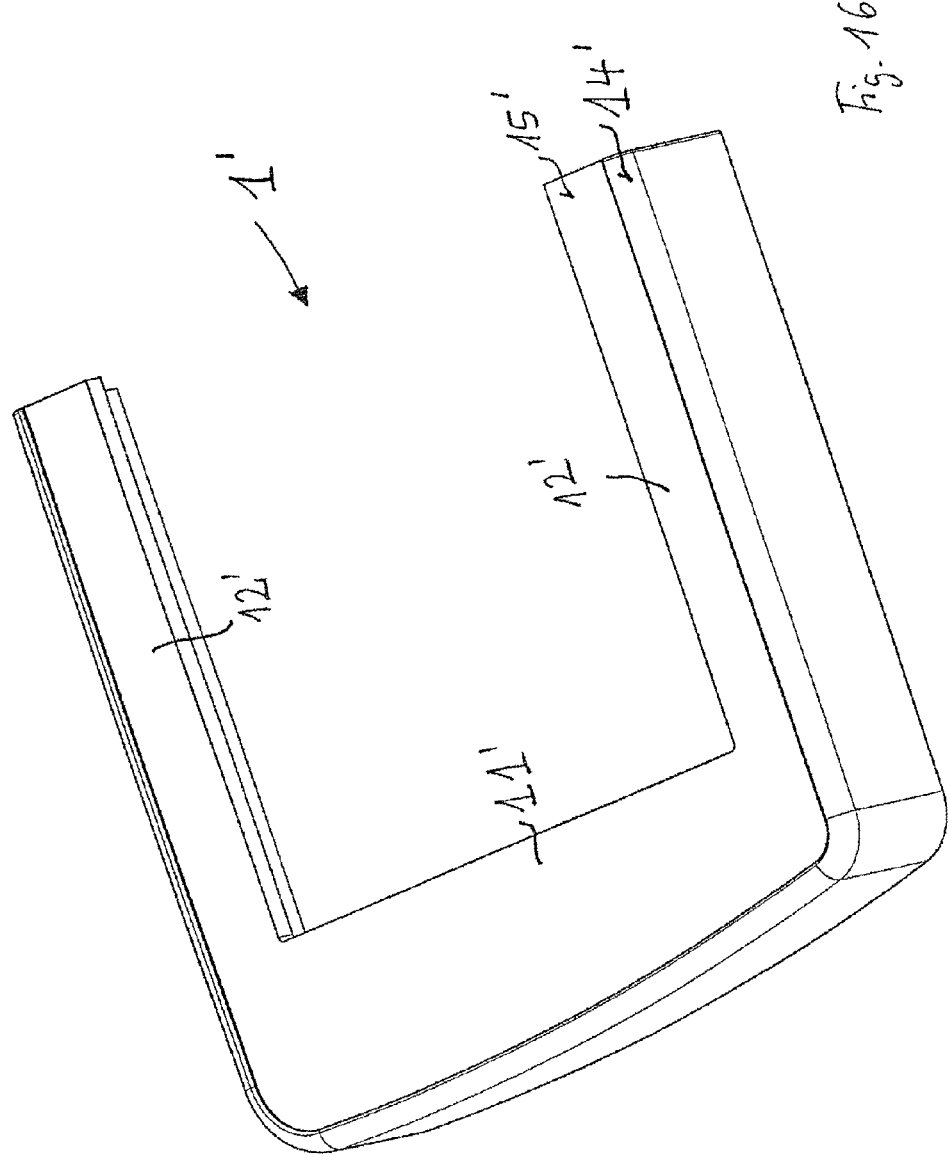

METHOD AND DEVICE FOR EMBOSSING AN UNEVEN SURFACE OF A BODY WITH A TRANSFER LAYER OF A HOT EMBOSSING FILM

This application claims priority based on an International Application filed under the Patent Cooperation Treaty, PCT/EP 2013/070021, filed on Sep. 25, 2013, and German Application No. DE 102012109315.6, filed on Oct. 1, 2012.

BACKGROUND OF THE INVENTION

The invention relates to a method and a device for stamping a non-planar surface of a body with a transfer layer of a hot-stamping foil. It further relates to a method for putting a planar foil portion into a non-planar form.

Conventionally, with a method for stamping a non-planar surface of a body with a transfer layer of a hot-stamping foil, first the body to be stamped (the workpiece), which is typically made of plastic, is laid manually on a holding apparatus, in particular a workpiece carrier, wherein the workpiece is preferably clamped. The workpiece holder is then moved into a position in which stamping is to be carried out. The hot-stamping foil is brought into position in that it is clamped, by means of a clamping frame, above the workpiece surface that is to be stamped when this clamping frame is moved into an operating position. Applying a negative pressure to the foil has the effect that the foil follows the shape of the surface contour of the workpiece. Only then is the actual stamping procedure completed, by pressing on the stamping die (which typically comprises a stamping unit made of silicone). Once the stamping procedure has finished, the clamping frame is moved back into its starting position, then the workpiece holder is also moved back into its corresponding starting position, and the stamped workpiece is removed.

A method of this kind has the constant problem that the formation of folds and wrinkles in the hot-stamping foil or in the stamped-on transfer layer is to be prevented.

SUMMARY OF THE INVENTION

It is an object of the invention to improve the previously known method of the type described and to identify a way in which the formation of folds and wrinkles can be suppressed with a method of this kind.

The object is achieved, in one aspect, by a method and a device for stamping a non-planar surface of a body with a transfer layer of a hot-stamping foil.

The method according to the invention for stamping a non-planar surface of a body with a transfer layer of a hot-stamping foil comprises bringing a stamping region of the hot-stamping foil into abutment against the surface of the body and pressing a heated stamping die against the hot-stamping foil and the surface of the body such that, in the stamping region, the transfer layer detaches from a support foil of the hot-stamping foil and adheres to the surface of the body, wherein in the method the hot-stamping foil is pre-heated in a region comprising the entire stamping region before the stamping die is pressed against the hot-stamping foil and the surface of the body.

The pre-heating should in particular be performed evenly. For this purpose, the region to be pre-heated should be defined generously around the entire stamping region. Preferably, a heating apparatus different from the stamping die is also used.

As a result of this pre-heating, the material of the hot-stamping foil, in particular the support foil thereof, expands.

A support foil of this kind is, for example, made of a suitable polyester material (e.g. PET) or polypropylene, polystyrene, PVC, PMMA, ABS or polyamide which has the elasticity or expansion capacity suitable for this method of hot-stamping.

Generally, the transfer layer of the hot-stamping foil has a plurality of layers, in particular a detachment layer (for example made of wax or compounds that contain wax), a protective coating, and an adhesive layer that can be activated by heat. In addition, one or more decorative layers and/or functional layers that are applied to parts of the surface or over the entire surface may be provided. Decorative layers are for example colored (opaque or transparent or translucent) coatings, metal layers or relief structures (with an effect that is haptic or optically refractive or optically diffractive). Functional layers are for example electrically conductive layers (metal, ITO (ITO=indium tin oxide)), electrically semiconductive layers (e.g. semiconductor polymers), electrically non-conductive layers (electrically insulating coatings), layers that have a visually matting or anti-reflective effect (e.g. with microscopic matting structures) or structures that modify the adhesive effect and/or the surface tension (lotus effect structures or the like). Between the individual layers there may be additional auxiliary layers, in particular layers of adhesion promoter. The individual layers of the transfer layer are approximately between 1 nm and 50 μm thick.

Because the hot-stamping foil expands, it can follow the shape of the surface of the body particularly well. This is particularly true if bringing the hot-stamping foil into abutment against the surface of the body comprises applying negative pressure from the side remote from the stamping die, since in that case the pre-heated hot-stamping foil, which can easily be drawn, advantageously follows the shape of the surface of the body as a result of the negative pressure. It is preferable in this case if the application of negative pressure is performed after the pre-heating has begun, and the pre-heating is continued until after the application of negative pressure has begun. In that case, in fact, during the procedure of the foil being made to abut against the surface of the body, as a result of the negative pressure this abutment can be furthered by the constant pre-heating.

It is particularly advantageous if the level of the negative pressure is increased, in stages or continuously, as the pre-heating continues. In this case two measures, which may be taken as alternatives or in conjunction with one another, are possible: in the case of a first measure, the value of the negative pressure is increased (that is to say, the difference between the ambient pressure on the one hand and the pressure prevailing on the side of the hot-stamping foil remote from the stamping die on the other). In the case of a second measure, the negative pressure is applied to a larger and larger region of the hot-stamping foil (on the side thereof that is remote from the stamping die). In the case of this second measure, two or more different apparatus for creating a negative pressure may be provided, each of which is coupled to different pressure chambers. These pressure chambers are characterized in that they are delimited by a hot-stamping foil portion, in particular as a result of the latter being clamped in a leak-tight manner.

In the context of the first measure, in which the value of the negative pressure is increased, there is preferably initially a difference between the ambient pressure and the pressure prevailing on the side of the hot-stamping foil remote from the stamping die of between 0.01 bar and 0.5 bar, and later (that is to say at some time after that) of between 0.25 bar and 0.99 bar, preferably between 0.25 bar and 0.93 bar. Intermediate stages are possible here. In the case of the said second measure, in which the region to which negative pressure is applied is made larger and larger, these values for the level of negative pressure may refer to different apparatus for creating a negative pressure acting on different regions of the hot-stamping foil.

If the level of the negative pressure is increased in stages or continuously, pre-heating is preferably continued until the greatest desired negative pressure is achieved and/or the negative pressure is applied to a largest region. This has the effect that the entire procedure of the hot-stamping foil portion following the shape of the surface of the workpiece body is furthered by the pre-heating, with the result that the formation of folds in the hot-stamping foil is suppressed for the entire duration of the method.

Preferably, the pre-heating is performed for a period of 1 to 30 s. Within the pre-heating time, the negative pressure may be adjusted in one or more stages, wherein the stages may be set variably within this time window of 1 to 30 s. This means that it is also possible for the foil to have negative pressure applied to it in only a single stage over the entire time. Furthermore, it is also possible for the other stages to be activated in this time interval, wherein the entire time interval of 30 s need not be used. For example, a first stage of creating negative pressure may be initiated after 0.1 s to 10 s (after the beginning of pre-heating). A second stage of creating negative pressure may furthermore be initiated after 10 s to 15 s. Finally, a third stage of creating negative pressure may be initiated after 15 s to 20 s. Initiating the respective stage may mean an increase in the value of the negative pressure or the activation of a separate apparatus for creating pressure in the form of a separate vacuum stage. It is also possible in particular to initiate different stages at similar time intervals. For example, the time interval between the beginning of pre-heating and initiating the first stage, on the one hand, and the time interval between initiating the first stage and the second stage, on the other, may be small, as can the latter and the time interval between initiating the second stage and initiating the third stage, etc.

The period over which pre-heating takes place and the generation of the negative pressure in one or more stages and the respective level of the negative pressure depend in particular on the size and shape of the body to be stamped. The term size of the body to be stamped refers in particular to the size of the surface over which the foil must be tensioned. In particular, it may be advantageous if, in the case of large surfaces, a relatively great negative pressure is applied and/or the length of the pre-heating time is correspondingly increased. In the case of relatively small bodies or surfaces, a shorter pre-heating time and/or level of vacuum may be sufficient. For these two process variables, pre-heating time and vacuum, the part geometry may also be a determining factor, however. That is to say that the required pre-heating time and/or vacuum may each vary very greatly, regardless of the size of the body or surface.

Particularly efficiently, the formation of folds in the hot-stamping foil is suppressed if the latter is pre-heated in the region comprising the stamping region to a temperature of between 80° C. and 160° C., preferably between 100° C. and 130° C.

In a preferred embodiment of the invention, before the beginning of pre-heating a heating apparatus different from the stamping die is moved into the vicinity of the hot-stamping foil, and after the end of pre-heating it is moved away from the hot-stamping foil in order to clear the path of the stamping die to the hot-stamping foil. This measure makes it possible to select a suitable heating apparatus, in the construction of which the construction of the rest of the device for stamping need not, or need only to a limited extent, be taken into account. The heating apparatus may in particular have a planar surface which in particular emits thermal radiation evenly over the entire surface and which is arranged parallel to the plane of the hot-stamping foil or a portion thereof. The heating apparatus may in particular be moved between the stamping die and the hot-stamping foil or above the hot-stamping foil.

In a further preferred embodiment of the method, bringing the hot-stamping foil into abutment against the surface of the body comprises clamping the hot-stamping foil by means of a clamping frame, and this clamping is performed before the beginning of pre-heating. With the aid of a clamping frame of this kind, a defined starting situation is created, in particular before negative pressure is applied to the hot-stamping foil portion. The clamping may in particular be performed by a suitable apparatus which utilizes the available space together with the heating apparatus. In this way, for example, the clamping apparatus may have a starting position out of which it is moved for the purpose of clamping before the heating apparatus is subsequently moved specifically into the position that was occupied by the clamping apparatus in the starting position.

The object is furthermore achieved by a device for stamping a non-planar surface of a body with a transfer layer of a hot-stamping foil, wherein the device has:
a holding apparatus for holding a body to be stamped,
a supply apparatus for supplying hot-stamping foil portions of a foil strip, in particular to a work region (wherein the supply apparatus may substantially consist of a roll of the foil strip that is to be unwound, and a roll of the foil strip that is to be wound up, and guide apparatus),
a clamping apparatus for leak-tight clamping (that is, sealed clamping) of a hot-stamping foil portion,
an apparatus for creating negative pressure in a region that is predetermined by the clamping apparatus and a hot-stamping foil portion clamped therein,
a heatable stamping die which comprises in particular silicone (in particular primarily for the actual stamping surface),
an insertable and withdrawable heating apparatus different from the heated stamping die (for insertion into and withdrawal from the work region) for pre-heating the hot-stamping foil portion that is clamped in the clamping apparatus, namely in particular by (the action of) thermal radiation.

As a result of the pre-heating that is provided, folds in the clamped hot-stamping foil portion are effectively suppressed. By separating the heating apparatus from the heated stamping die, the pre-heating can be performed in a targeted manner and in a manner appropriate to the shape of the body to be stamped without having to take account of other device apparatus (such as the stamping die, for example).

Preferably, the apparatus for creating negative pressure is set up to increase the value of the negative pressure in a plurality of stages and/or to enlarge the region to which negative pressure is applied. As a result of this measure, in conjunction with the heating apparatus it is possible to further the procedure of the hot-stamping foil portion following the shape of the surface of the body.

Preferably, the device comprises a control apparatus for controlling both the heating apparatus and the apparatus for creating negative pressure, and this control apparatus is set up (in fact in particular is suitably programmed) first to set the heating apparatus in operation and then to trigger the apparatus for creating negative pressure one after the other in order to apply increasing levels of negative pressure to a hot-stamping foil portion that is clamped in a leak-tight manner (that is to say with the value of the negative pressure increasing and/or with the region to which it is applied becoming larger).

Regardless of whether the negative pressure is provided in increasing levels, because of the coordinated control of the heating apparatus and the apparatus for creating negative pressure a control apparatus of this kind is particularly suitable for furthering the procedure of the hot-stamping foil portion following the shape of the body. However, this is particularly the case if the level at which the negative pressure is created is increased during operation of the heating apparatus.

In a further aspect, the object is achieved by a method for putting a planar foil portion into a non-planar form, wherein the foil portion is heated and as a result of the application of negative pressure from one side follows the shape of a body, wherein while heating continues the negative pressure is created and its level is gradually, in particular in stages, increased in that its value is increased and/or the size of a region in which it is created is increased.

BRIEF DESCRIPTION OF THE DRAWINGS

A preferred embodiment of the method according to the invention will be described below with reference to the drawing, in which FIG. 16 shows a perspective view of a second workpiece to which the method according to the invention applicable in an embodiment in order to stamp a surface thereof.

DETAILED DESCRIPTION OF THE INVENTION

Figure 1:
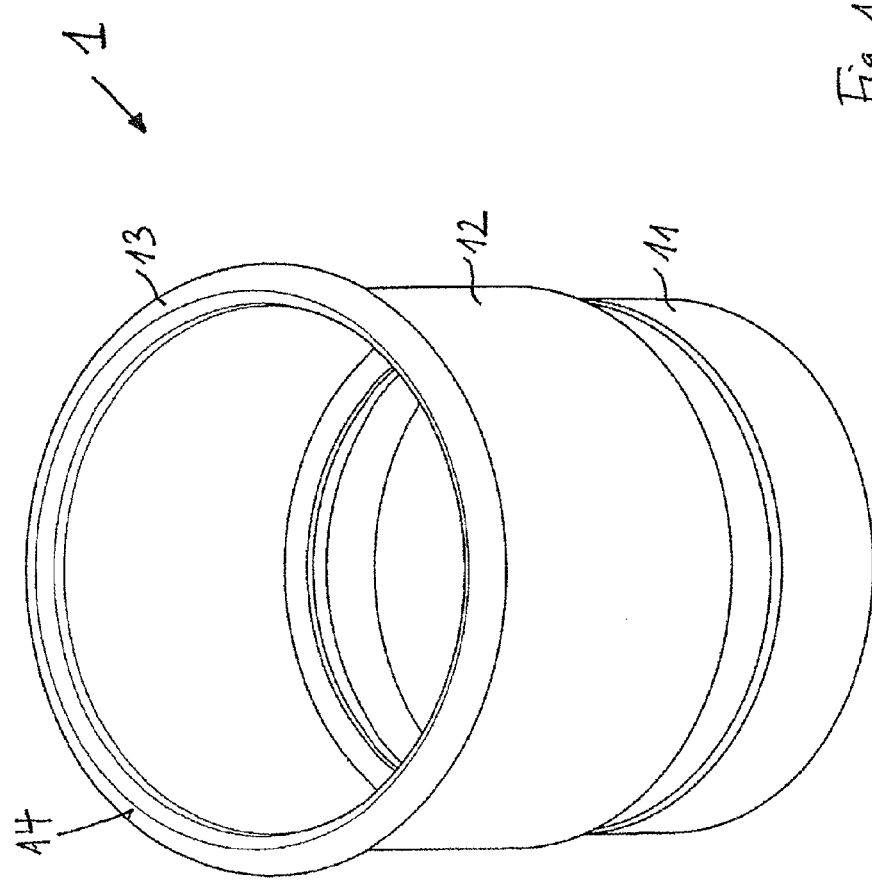
FIG. 1 is a perspective view of a workpiece that is stampable in the context of the method according to the invention.
Figure 2:
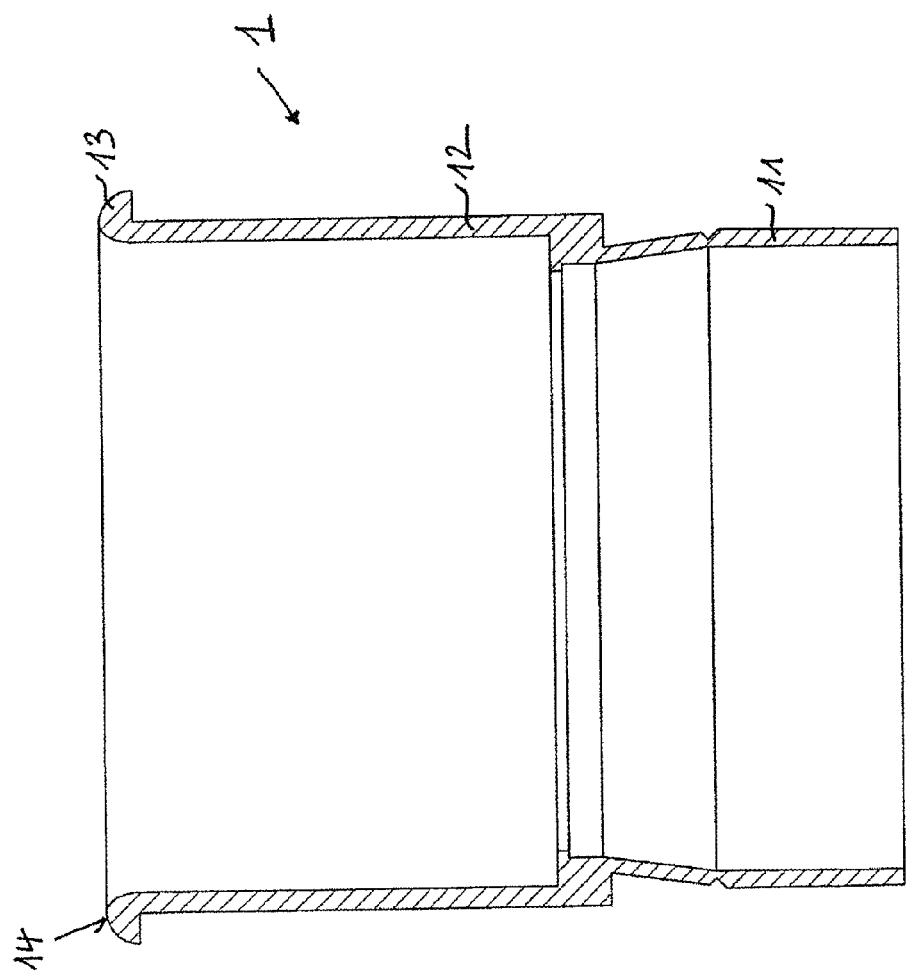
FIG. 2 shows a section through the workpiece from FIG. 1.

A workpiece, shown individually in FIGS. 1 and 2 and designated overall by 1, is tubular, substantially cylindrical, having a base region 11 which can be seen in section in FIG. 2 and, on this base region, a perfectly cylindrical or slightly conically reducing upper region 12. At the upper end of the upper region 12 there is arranged a bead 13, and the present method precisely concerns stamping the surface 14 of this bead 13 with a decorative foil, in particular a transfer layer and a hot-stamping foil.

For example, the workpiece 1 has an overall height of 89 mm, an internal diameter of 74 mm and an external diameter of 85 mm, and the radius of curvature of the bead 13 at the point with the most pronounced curve is 3.8 mm.

The workpiece 1 consists of acrylonitrile butadiene styrene (ABS), polycarbonate (PC) or is produced from a mixture of these two materials (e.g. ABS-PC) together.

Figure 3:
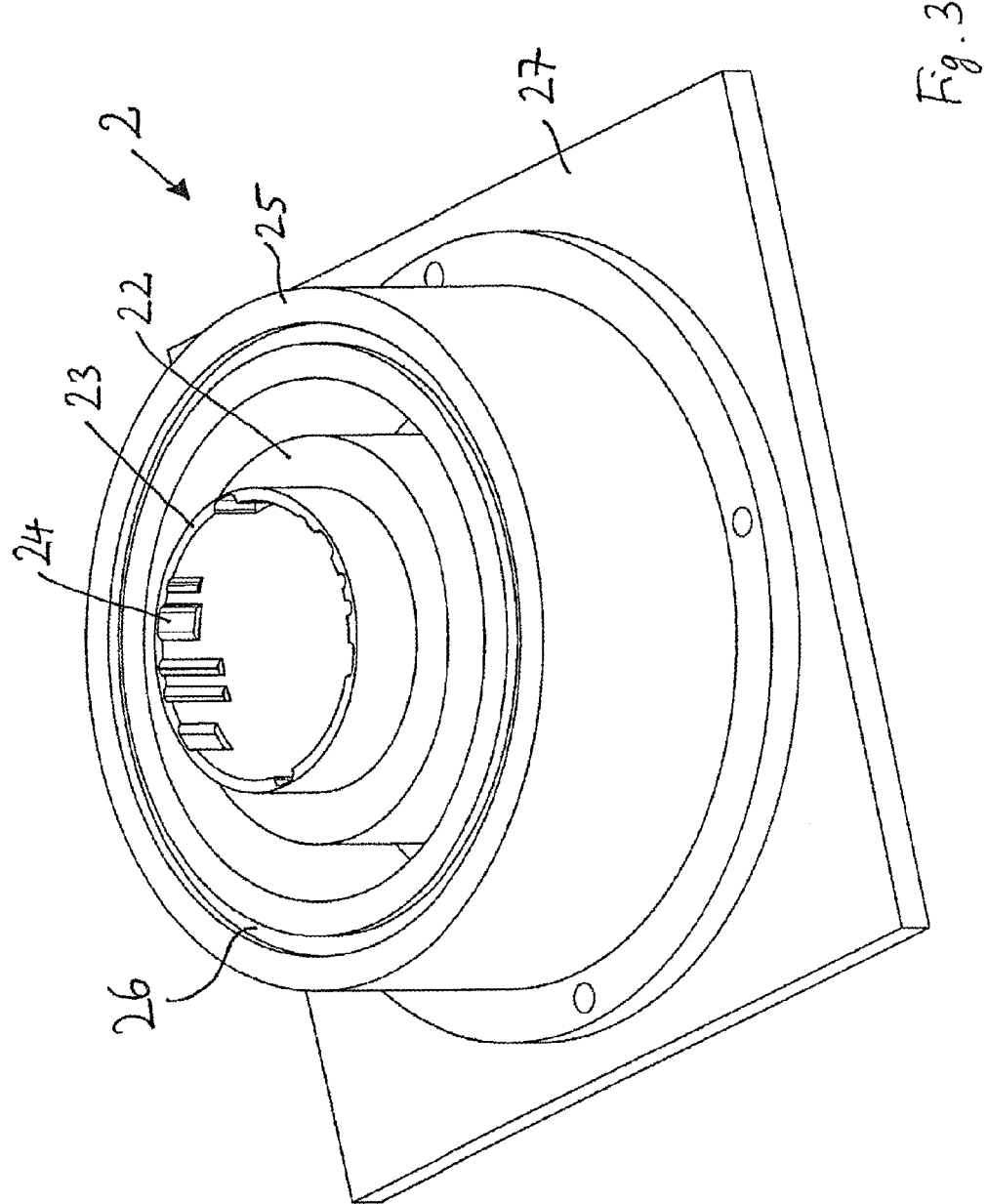
FIG. 3 shows a perspective view of a workpiece receiving apparatus which fits the workpiece from FIG. 1 and FIG. 2.
Figure 4:
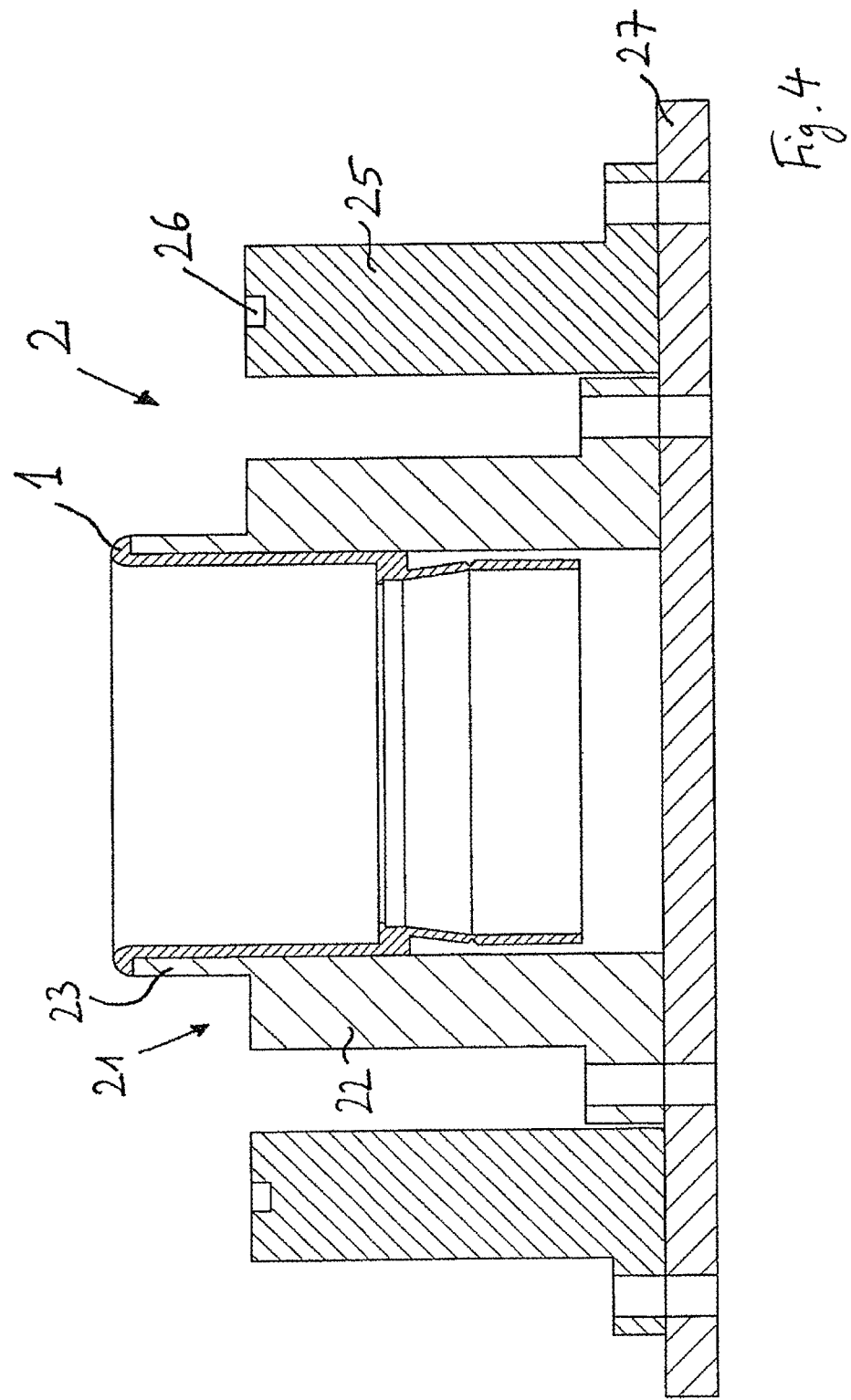
FIG. 4 shows a section through the workpiece receiving apparatus from FIG. 3.

The workpiece receiving apparatus for the workpiece 1 from FIGS. 1 and 2, which is shown overall in FIGS. 3 and 4 and designated there by 2, comprises the actual receiving element 21, which has a lower stable cylindrical thick-walled region 22 and an upper thin-walled region 23 against which the bead 13 of the workpiece 1 can be supported. FIG. 4 shows the workpiece 1 received in the workpiece receiving apparatus 2. For receiving there serve the recesses 24 in the thin-walled region 23, which are shown in FIG. 3.

The workpiece receiving apparatus further has an outer cylindrical wall 25. Formed on the upper side of this is an annular groove 26 in which a sealing ring (not shown in FIGS. 3 and 4) can be received. The actual receiving element 21 is arranged, in the region of its thick-walled region 22, on a base plate 27, and the outer cylindrical wall 25 is also arranged on this base plate 27.

Figure 5:
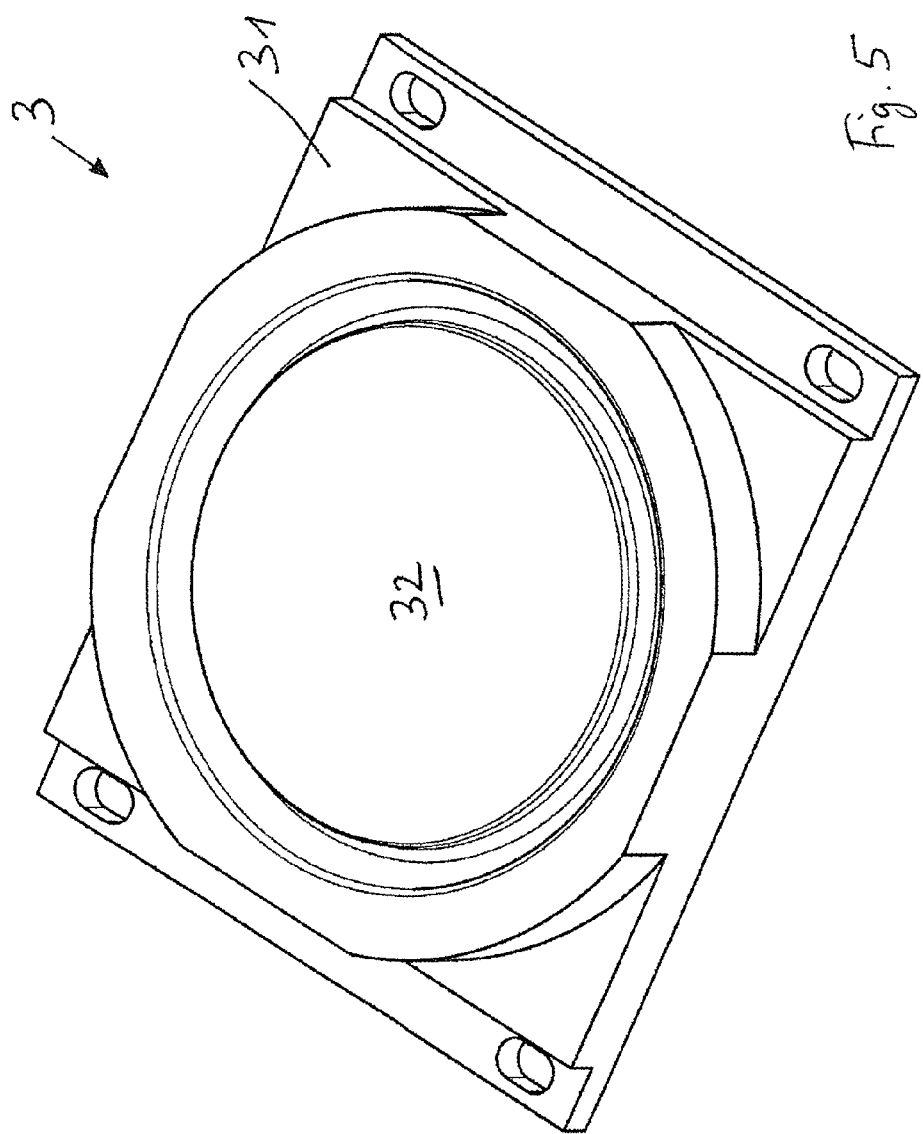
FIG. 5 shows a perspective view of a heatable stamping die such as may be used for stamping the workpiece from FIG. 1 and FIG. 2.
Figure 6:
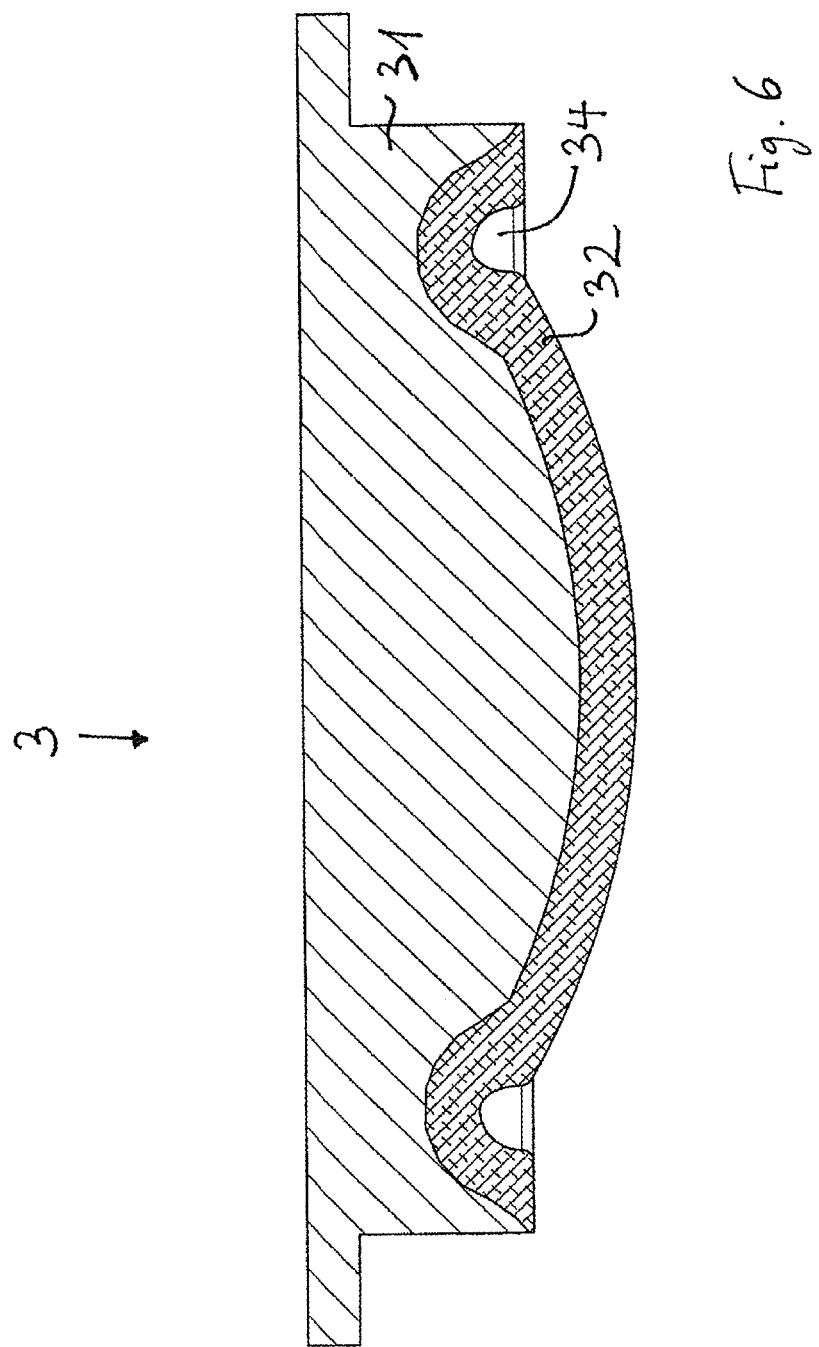
FIG. 6 shows a section through the stamping die from FIG. 5, FIGS. 7-15 each show a section through a vertical stamping machine according to the invention in a particular embodiment, for explaining different steps of an embodiment of the method according to the invention as it is performed with reference to the workpiece from FIG. 1 and FIG. 2 using the workpiece receiving apparatus from FIG. 3 and FIG. 4 and the stamping die from FIG. 5 and FIG. 6.

A stamping die which is shown in FIGS. 5 and 6 and is designated there overall by 3 has the actual die body 31, which consists for example of a dimensionally stable metal, and this die body 31 carries the actual die surface 32, which in the present case consists of silicone and through which heating elements (not shown in the figures) pass, or which at the rear side abuts against or adjoins a heating element which heats the die body 31 from the rear side. The die surface 32 is curved in a slightly convex manner and has a concave region 34 in the manner of an annular groove. This concave region 34 complements the bead 13 of the workpiece 1 to be stamped.

FIGS. 7 to 15 show a vertical stamping machine which is designated 100 overall, as an embodiment example of a device for stamping a non-planar surface of a body with a transfer layer of a hot-stamping foil.

In the lower region there is shown the workpiece receiving apparatus 2, which carries and holds the cylindrical workpiece 1. In this case, a sealing ring 28 is received in the annular groove 26 in the outer cylindrical wall 25.

In the upper region of each of the figures the stamping die 3 is visible, arranged on a press 33.

A hot-stamping foil 5 is unwound from a hot-stamping foil strip, in a manner not shown in the figures, and supplied to the vertical stamping machine 100. On the other side, the used hot-stamping foil, that is to say the support foil and the residual, partly undetached transfer layer, is guided away and where appropriate wound onto a roll.

A hot-stamping foil of the type of the hot-stamping foil 5 consists of a support foil, not shown in the figures, which consists for example of a suitable polyester material, and arranged on this support foil and possibly separated therefrom by a separate detachment layer is the so-called transfer layer. The transfer layer is one or more partial layers which, in the present case, provide a decoration which is to be transferred to the surface 14 of the bead 13 of the workpiece 1. The transfer layer adheres to the surface 14 of the workpiece 1 by means of an adhesive that can be activated by heat, which is activated during hot stamping, melts as a result and returns to the solid state again on cooling, and which provides a correspondingly advantageous adhesion between the transfer layer and the surface 14.

Figure 7:
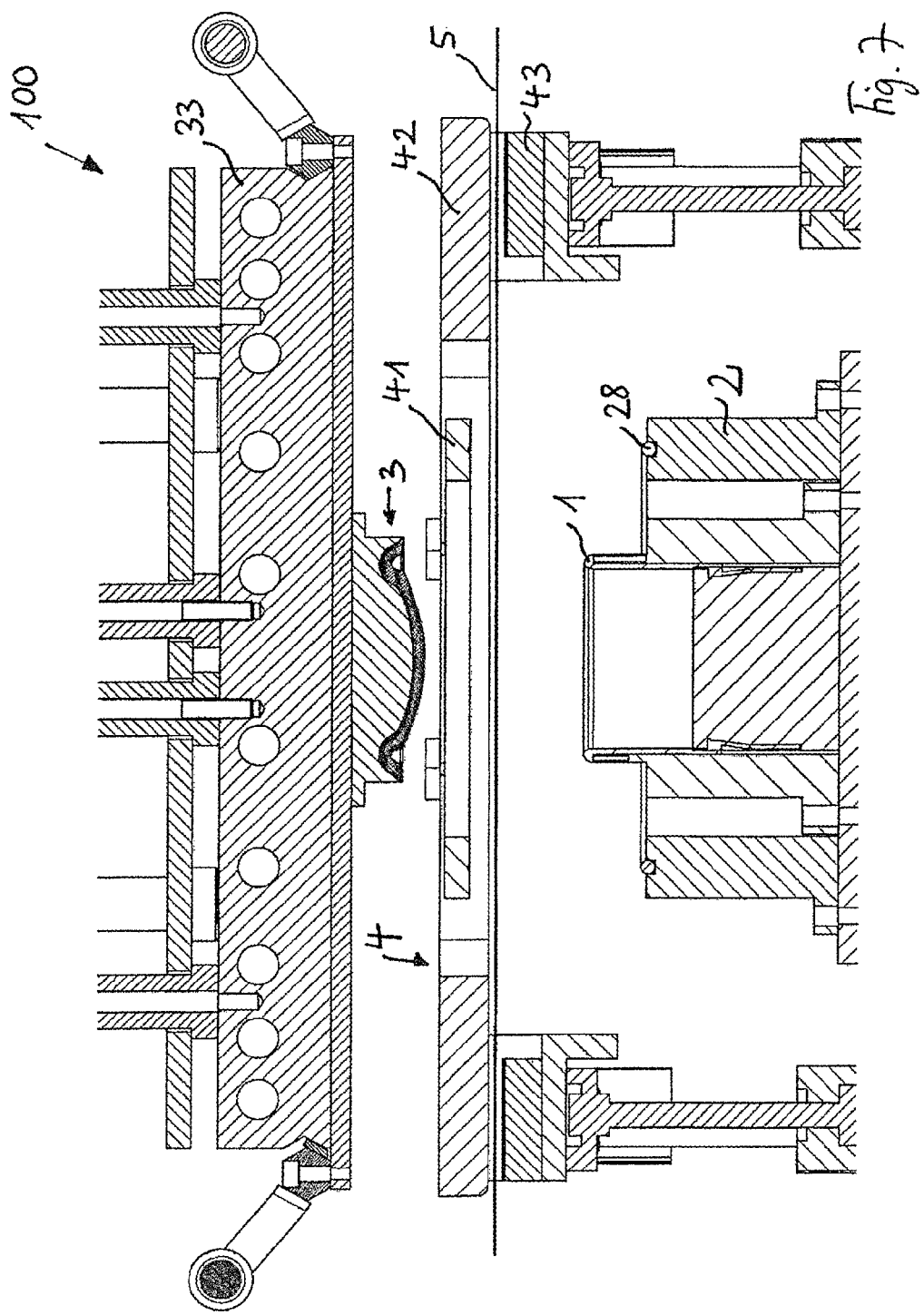

The method according to the invention operates as described below:

FIG. 7 shows a clamping frame 4 which has an inner clamping frame upper part 41, fitting the outer cylindrical wall 25 of the workpiece receiving apparatus 2, and the clamping frame 4 further has an outer clamping frame upper part 42 and, associated with this, an outer clamping frame lower part 43, which are constructed to fit one another. FIG. 7 illustrates a starting position of the clamping frame 4, in which the hot-stamping foil 5 is not yet affected by the clamping frame 4.

Figure 8:
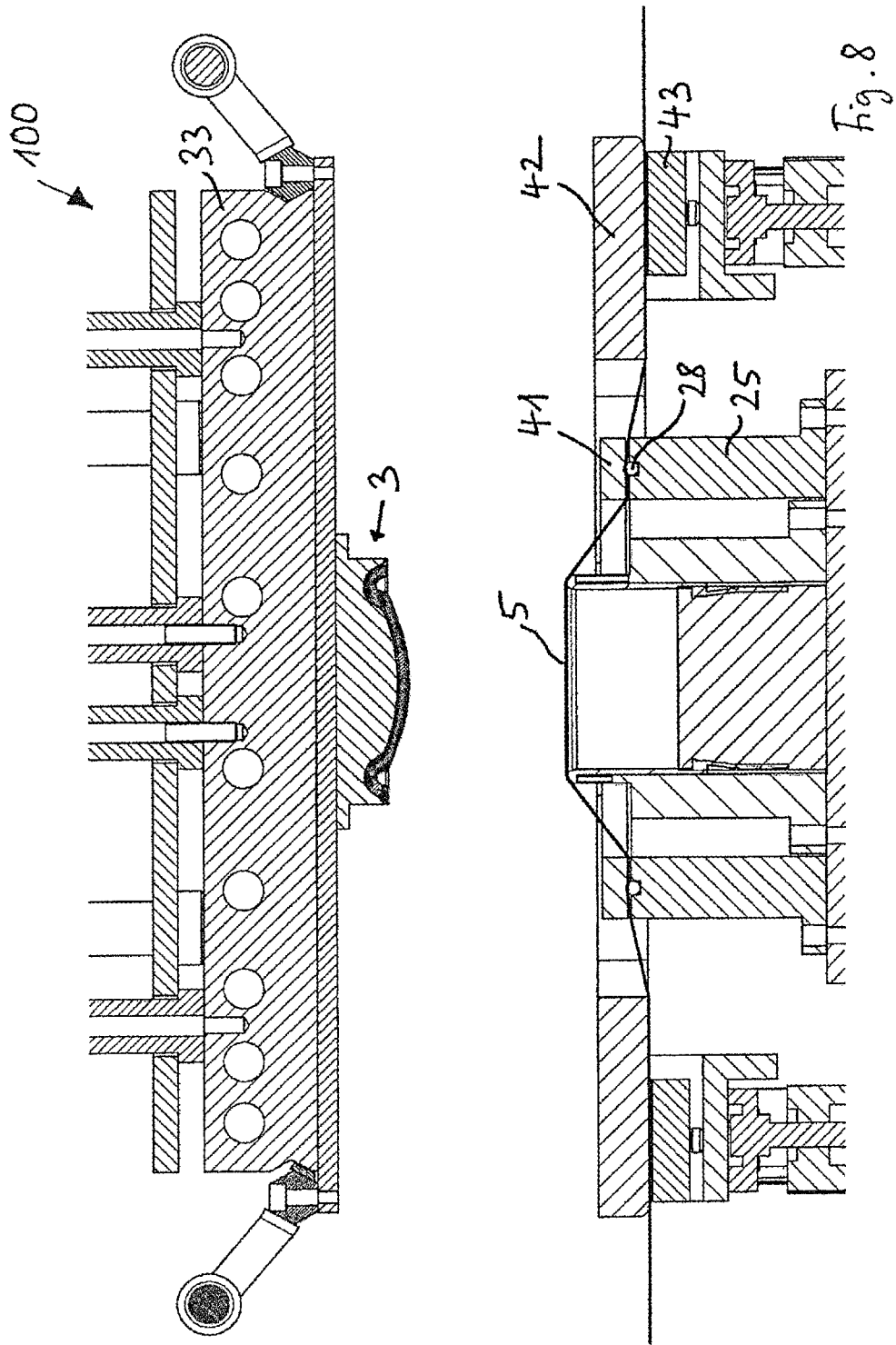

Now, however, the clamping frame 4 is moved downwards into the clamping position shown in FIG. 8. In this clamping position, the inner clamping frame upper part 41 lies on the outer cylindrical wall 25 of the workpiece receiving apparatus 2 with the hot-stamping foil 5 in between, wherein the presence of the sealing ring 28 has the effect of delimiting and sealing an inner hot-stamping foil portion of the hot-stamping foil 5. The arrangement is stabilized by the fact that the hot-stamping foil 5 is also clamped between the outer clamping frame upper part 42 and the outer clamping frame lower part 43.

Figure 9:
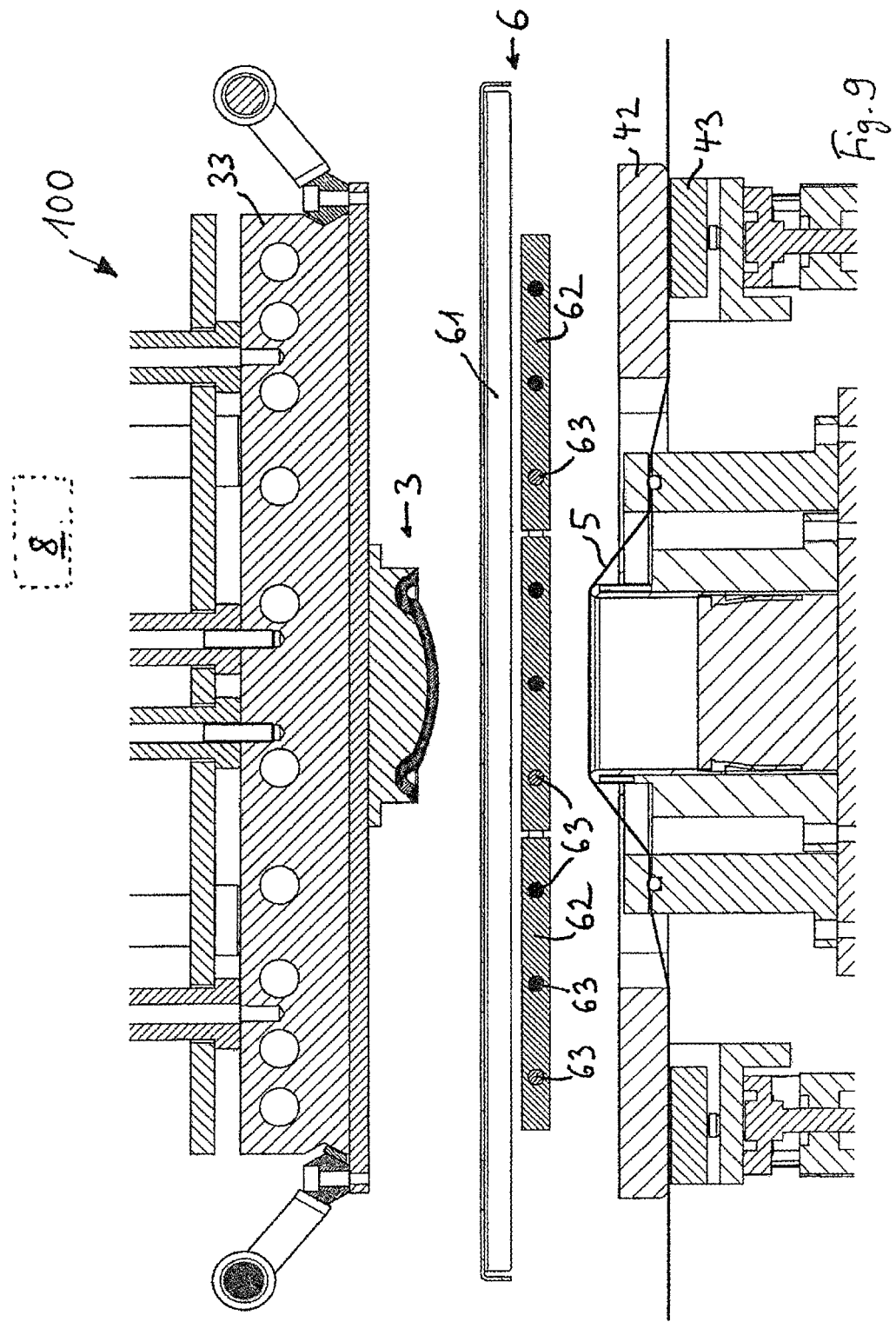
Figure 10:
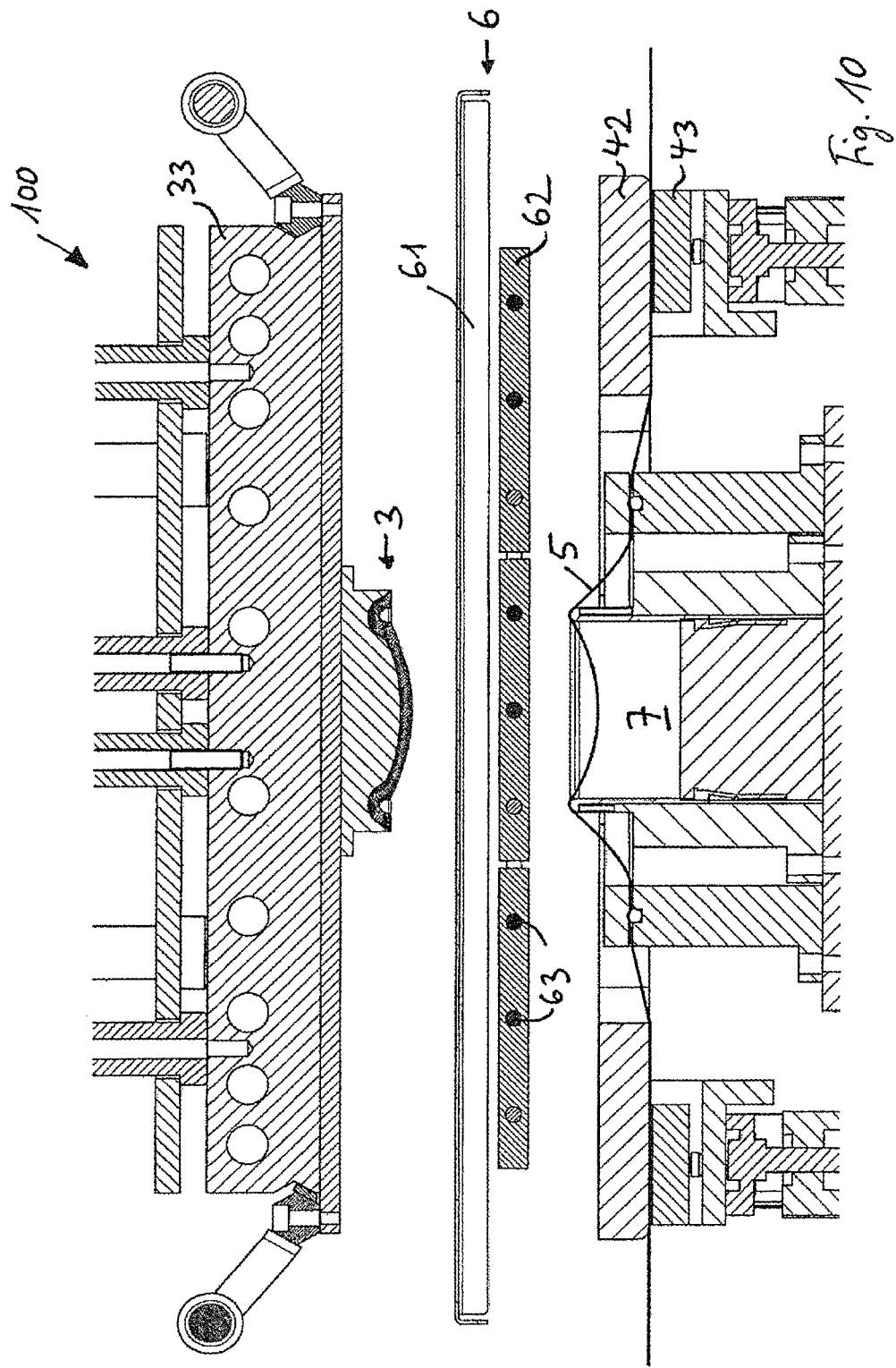

Now, as can be seen from FIG. 9, a heating apparatus 6 is moved into the work region, shown in the figures, of the vertical stamping machine 100. The heating apparatus 6 comprises a carrier 61 and, in the present case, three planar heating plates 62 through which there pass heating rods 63 and which, in operation, emit heat evenly towards the hot-stamping foil 5.

Within the context of the method, a control apparatus 8 controls the components of the vertical stamping machine 100 in a suitable manner. Here, it can be responsible for clamping the hot-stamping foil portion of the hot-stamping foil 5 securely, and also for moving the heating apparatus 6 in. In the present case, the control apparatus 8 controls the heating apparatus 6 such that the emission of heat begins. The procedure of heating is also continued during the subsequent steps until the situation shown in FIG. 11 is reached.

In the example, 4 s after the start of heating, air is pumped out of a first space 7, which is delimited by the hot-stamping foil 5 and is in particular constructed in the interior of the workpiece 1, i.e. a negative pressure is applied to the space 7. This results in the situation that can be seen in FIG. 10, in which the foil portion is drawn into the interior of the workpiece 1. During this, heating is continued.

The fact that heating continues ensures that the hot-stamping foil 5 does not form folds, or forms only few folds, in the region of the workpiece 1, and follows the shape of the bead 13 of the workpiece 1 as smoothly as possible.

After a further 2 s—and with heating still going on—negative pressure is applied to a further space 7'. Here, in the present case this is the space between the thick-walled region 22 of the workpiece receiving apparatus 2 and the outer cylindrical wall 25 thereof. The hot-stamping foil 5 thus follows the shape of the bead 13 of the workpiece 1 even more closely, wherein it forms no folds, or at least few folds, because of the continuing heating by the heating apparatus 6.

During pre-heating of the hot-stamping foil, the foil temperature should be between 100° C. and 130° C. The negative pressure in the space 7 should be approximately 0.1 bar, and the negative pressure in the space 7' approximately 0.91 bar. The entire period of heating ends after approximately 11 s.

Once pre-heating has ended, the heating device 6 is moved out of the work region, shown in FIGS. 7 to 15, of the vertical stamping machine 100 again, resulting in the situation shown in FIG. 12.

Subsequently, the press 33 is moved downwards together with the die 3 into the position shown in FIG. 13, wherein the die surface 32 is heated, with the result that hot stamping is performed in the region of the annular groove 34; thus specifically the transfer layer is transferred from the hot-stamping foil portion of the hot-stamping foil 5 to the surface 14.

Further subsequently, see FIG. 14, the press 33 is moved upwards again, and finally, as can be seen in FIG. 15, the clamping frame 4 is returned from its clamped position back into the starting position. The clamping frame 4 guides the remaining hot-stamping foil 51 (that is to say the support foil, without the transfer layer, of which in particular certain regions are transferred) away from the workpiece 1, whereas the transfer layer remains on the surface 14 of the bead 13 of the workpiece 1, see reference number 52. In a subsequent step, the workpiece 1 can then be removed from the workpiece receiving apparatus 2, and the method is complete.

The method may also be used on other workpieces, of which an example is shown in FIG. 16, as workpiece 1'. The workpiece 1' is U-shaped and has a base body 11' with two limbs 12'. There is a peripheral stamping surface 14', and adjacent to this is a substantially planar surface 15' that is not to be stamped.

On provision of a suitable workpiece receiving apparatus and adaptation of the shape and dimension of the clamping frame 4 and the stamping die 3, this workpiece 1' can also be stamped using the same vertical stamping machine 100.

The workpiece 1' has for example an overall height of 27 mm, an overall length of 134 mm and a width of 146 mm, and the curvature at the stamping surface 14' is approximately 5 mm in size in the region of the greatest radius of curvature. Acrylonitrile-butadiene-styrene (ABS) or polycarbonate (PC), or compositions made from these materials, are likewise provided as material.

FIG. 16 is intended to make it clear that the method according to the invention is not restricted to an application with purely cylindrical or tubular workpieces. It is not even a requirement that a semi-opening, delimited by two to three sides, is present.

As a result of the method according to the invention, because of the step of pre-heating by the heating apparatus 6 independently of heating of the stamping die 3, provision is made for the hot-stamping foil 5 to follow the shape of the stamping surface 14 (or 14') in a manner that is particularly efficient and free of folds. The method is particularly suitable where such stamping surfaces have a particularly small stamping radius, that is to say a particularly small radius in the region of the greatest curvature.

The time sequence described, of pre-heating and applying negative pressure to a foil, as performed in a controlled manner by the control apparatus 8, can also be implemented efficiently in conjunction with other methods, for example in the case of back injection molding of decorative foils, if a decorative foil of this kind is to follow the shape into an injection mold in a manner free of folds, or when deep drawing foil webs or foil sheets of greatly varying strengths or thicknesses.

LIST OF REFERENCE NUMBERS

1 Body
2 Holding apparatus
3 Stamping die
4 Clamping frame
5 Hot-stamping foil
6 Heating apparatus
7, 7' Pumped-out spaces
8 Control apparatus
11 Base region of the body 1
12 Upper region of the body 1
13 Bead
14 Surface of the bead 13
21 Receiving element
22 Thick-walled region
23 Thin-walled region
24 Recesses 25 Cylindrical outer wall
26 Annular groove
27 Base plate
28 Sealing ring
31 Die body
32 Die surface
33 Press
34 Concave region
41 Inner clamping frame upper part
42 Outer clamping frame upper part
43 Outer clamping frame lower part
52 Transfer layer
61 Carrier
62 Heating plates
63 Heating rods
100 Vertical stamping machine

The invention claimed is:

1. A method for stamping a non-planar surface of a body with a transfer layer of a hot-stamping foil, the method comprising:
   bringing a stamping region of the hot-stamping foil into abutment against the surface of the body;
   pressing a heated stamping die against the hot-stamping foil and the surface of the body such that, in the stamping region, the transfer layer detaches from a support of the hot-stamping foil and adheres to the surface of the body; and
   pre-heating the hot-stamping foil by a heating apparatus different from the heated stamping die in a region comprising the entire stamping region while bringing the stamping region into abutment against the surface of the body, but before pressing the heated stamping die against the hot-stamping foil and the surface of the body.

2. A method for stamping a non-planar surface of a body with a transfer layer of a hot-stamping foil, the method comprising:
   bringing a stamping region of the hot-stamping foil into abutment against the surface of the body;
   pressing a heated stamping die against the hot-stamping foil and the surface of the body such that, in the stamping region, the transfer layer detaches from a support of the hot-stamping foil and adheres to the surface of the body; and
   pre-heating the hot-stamping foil by a heating apparatus different from the heated stamping die in a region comprising the entire stamping region while bringing the stamping region into abutment against the surface of the body, but before pressing the heated stamping die against the hot-stamping foil and the surface of the body,
   wherein bringing the stamping region of the hot-stamping foil into abutment against the surface of the body comprises applying negative pressure from a side remote from the stamping die, wherein applying negative pressure is performed after the pre-heating has begun, and the pre-heating is continued until after the application of negative pressure has begun.

3. A method according to claim 2, wherein a level of the negative pressure is increased, in stages or continuously, and wherein a value of the negative pressure is increased and/or the negative pressure is applied to a larger region.

4. A method according to claim 3, wherein a difference between ambient pressure and pressure prevailing on the side of the hot-stamping foil remote from the stamping die is between 0.08 bar and 0.93 bar, and is varied in different stages at a defined time interval.

5. A method according to claim 3, wherein pre-heating is continued until a greatest desired negative pressure is achieved and/or the negative pressure is applied to a largest region.

6. A method according to claim 2, wherein the pre-heating is performed for a period of 1 to 30 s, variably, and/or negative pressure is applied to a first portion of the hot-stamping foil for the entire duration of pre-heating, or negative pressure is applied to the first portion of the hot-stamping foil after a period of 0.1 s to 10 s after the beginning of pre-heating, and/or negative pressure is applied to a second portion of the hot-stamping foil after a period of between 10 s and 15 s after the beginning of pre-heating.

7. A method according to claim 1, wherein pre-heating the hot-stamping foil in the region comprising the stamping region is performed such that the hot stamping foil is pre-heated to a temperature of between 80° C. and 160° C.

8. A method according to claim 1, wherein before the beginning of pre-heating, the heating apparatus different from the stamping die is moved into a vicinity of the hot-stamping foil, and after the end of pre-heating, the heating apparatus is moved away from the hot-stamping foil in order to clear a path of the stamping die to the hot-stamping foil.

9. A method for stamping a non-planar surface of a body with a transfer layer of a hot-stamping foil, the method comprising:
   bringing a stamping region of the hot-stamping foil into abutment against the surface of the body;
   pressing a heated stamping die against the hot-stamping foil and the surface of the body such that, in the stamping region, the transfer layer detaches from a support of the hot-stamping foil and adheres to the surface of the body; and
   pre-heating the hot-stamping foil in a region comprising the entire stamping region while bringing the stamping region into abutment against the surface of the body, but before pressing the heated stamping die against the hot-stamping foil and the surface of the body,
   wherein bringing the hot-stamping foil into abutment against the surface of the body comprises clamping the hot-stamping foil by means of a clamping frame, wherein the clamping is performed before the beginning of pre-heating.

* * * * *